2,910,360

ANIMAL FEED COMPOSITIONS

John R. De Zeeuw and Frederick Sauer, Terre Haute, Ind., assignors to Chas. Pfizer & Co., Inc., New York, N.Y., a corporation of Delaware No Drawing. Application November 6, 1957
Serial No. 694,750

11 Claims. (Cl. 99—2)

This invention relates to unique and valuable animal feed compositions, and more particularly concerns the fortification and improvement of standard, nutritionally balanced feeds by the addition thereto of mixtures of dietary substances.

Tetracycline-type antibiotics are broad spectrum antibiotics of varied, wide application, the efficacy of which is well known and attested to in the medical literature. The term tetracycline-type antibiotic, as employed in this application, encompasses oxytetracycline, chlortetracycline, tetracycline, bromtetracycline, dimethyltetracycline and dimethylchlortetracycline, which are readily available commercial products. Rimocidin and nystatin are well known antibiotics commonly classified as antifungal agents.

It has been found that mixtures of a tetracycline-type antibiotic with an antifungal agent such as rimocidin and nystatin may be added to the diet of various animals to produce highly desirable results. Thus, when an animal feed comprising a standard or conventional, nutritionally balanced feed composition and at least one form of a tetracycline-type antibiotic together with an antifungal agent such as rimocidin and nystatin is fed to an animal, it is found that the animal's growth is accelerated and/or its feed efficiency improved. Specifically, any animal feed composition may be prepared to comprise the usual nutritionally balanced carbohydrates, proteins, minerals, and vitamins together with a mixture of the antibiotics as described above. Other antifungal agents, such as cycloheximide and acetopyrrothine are found to be of value in the compositions of this invention but suffer from limitations. Some of the various components are commonly grains such as ground grain, and grain by-products; animal protein substances, such as those found in fish meal; vitaminaceous mixtures, e.g. vitamin A and D mixtures, riboflavin supplements and other vitamin B complexes; and bone meal and limestone to provide minerals.

Mixtures of pure antibiotics of both the tetracycline type and the above-mentioned antifungal agents, or derivatives or salts thereof, or crude forms of these materials such as fermentation residues from which the pure antibiotics are obtained, or other residues, may be added in minor proportion to these conventional feeds. The resulting new feed compositions have marked effects on the rate of growth and at the same time also on the health of the various animals due to presence of therapeutic amounts of tetracycline antibiotics. In addition, the feed efficiency is considerably increased. Feed efficiency may be defined as the number of pounds of feed required to produce a pound gain in weight. Increased feed efficiency is an extremely important economic factor in raising animals. Simply stated, the compositions of this invention when fed to animals are more efficiently converted to animal body weight than prior art compositions. A further advantage of the feed compositions of this invention lies in the amounts of the tetracycline-type antibiotic employed. These levels of the tetracycline antibiotics are sufficient to provide therapeutic protection against infectious disease of various types which heretofore has been an insidious problem in the cultivation of animals in large numbers, for example, broilers which are grown in flocks numbering approximately 2,000 to 20,000. The advantage of the novel feed compositions is that they may enable the continuous use of therapeutic levels of the antibiotics economically due to the inclusion of an antifungal agent which improves the nutritional properties of the tetracycline antibiotics.

The unique feed compositions of this invention are found to be particularly valuable in their use with non-ruminant animals, such as chickens, turkeys, hogs, ducks and so forth. A type of conventional feed material which may be employed is recommended to contain roughly between 50% and 80% of grains, between 0% and 10% animal protein, between 5% and 30% vegetable protein, between 2% and 4% minerals together with supplemental vitaminaceous sources. When a feed containing a major proportion of these substances and a minor proportion of a mixture of a tetracycline-type antibiotic and an antifungal agent such as rimocidin and nystatin is employed, these animals reach the desirable weight in a shorter period of time than usual with a markedly greater feed efficiency. As mentioned above, this simply means that animals reach a given weight level with the consumption of smaller quantities of feed than is possible with feeds not containing the valuable, growth-promoting additives of this invention. The mixtures of tetracycline-type antibiotics and the antifungal agent which result in increased animal weight and feed efficiency should contain from about 100 milligrams to about 20 grams of the antifungal agent per ton of feed. The ratio of the tetracycline-type antibiotic with the above range of antifungal agent should range from about 10 to about 500 grams per ton of feed. For example, when the rimocidin level of the antibiotic mixture is 200 milligrams per ton of feed, from 10 to 500 grams of a tetracycline-type antibiotic per ton of feed may be employed to provide optimum results. Larger amounts of the antifungal agent do not seem to provide appreciable advantage over the above specified range. For example, performance indices of the varied feed compositions of this invention show no appreciable increase with levels of antifungal agents above the specified range. Performance indices is a term commonly employed in the art and may be defined as the ratio of weight of the animals to feed efficiency. This provides a means of accounting for both weight gain and feed efficiency in a single term. In general, the improved weight gains and feed efficiencies obtained by employing the feed compositions of this invention specifically apply to poultry, baby pigs, growing and fattening swine, although other animals are expected to respond in similar manner. The level of antifungal antibiotic employed does not appear to be completely dependent on the amounts of the tetracycline antibiotic. However, with larger amounts of tetracycline-type antibiotics for any given level of antifungal antibiotic, increased weight and feed efficiency is noted. The antibiotics may be added separately to the standard feed or premixed in the desired ratio and added to the feed mixture. The mixtures are then thoroughly blended by standard procedures, such as in a twin-shell blender to ensure homogeneity and are found to have suitable shelf-life for storage purposes, no appreciable diminution of antibiotic activity being noted after long periods of storage.

The outstanding results obtained with the compositions of this invention are not fully understood, nor is any theory offered to explain these results. It is known in the prior art that tetracycline-type antibiotics when incorporated in animal feed compositions in small amounts, for example, up to 10 grams per ton of feed, induce increased growth. The use of larger amounts of these antibiotics is not generally growth-promoting but is considered therapeutic, mainly in preventing various animal infections. Economically, the continuous inclusion of therapeutic amounts of tetracycline antibiotics in the daily diet of healthy animals as a preventive measure against infection is prohibitive in many instances. However, the teachings of this invention now make the inclusion of therapeutic amounts of these antibiotics economically practical when an antifungal agent such as rimocidin and nystatin is also incorporated. This is primarily due to the increased growth and markedly increased feed efficiency obtained with the compositions of this invention. The present invention provides the agricultural industry with growth-promoting, therapeutic feed compositions which allow a more efficient and economical animal growth.

Varied forms of the antibacterial antibiotics in the compositions of this invention may be employed as mentioned above. For example, the antibiotics as well as the non-toxic metal and hydrohalide salts, for example, the hydrochloride and calcium salts of the antibiotics are found suitable. In addition there may be used crude forms of the antibiotics precipitated from their respective fermentation broths with a variety of organic bases such as (1) primary alkyl amines for example, n-octylamine, n-hexylamine, decylamine and so forth; (2) secondary alkyl amines, for example, di-n-hexylamine, di-n-octylamine, n-hexyl-n-octylamine and so forth; primary phenyl alkyl amines such as benzylamine, phenethylamine, γ-methylbenzylamine and so forth; (3) long chain alkyl-tri-short chain alkyl ammonium halides wherein the long chain has 8 to 18 carbon atoms, the short chains have 1 to 3 carbon atoms and the halide is chloride, bromide or iodide, such as octadecyl-trimethyl-ammonium chloride, decyl-triethylammonium chloride, dodecyl-trimethylammonium chloride, cityltrimethylammonium chloride, mixtures of triethylammonium salts of the mixture of amines derived by a commercially operated process from soybean fatty acids, from coconut oil fatty acids and other sources (4) long chain alkyl-di-short chain alkyl benzylammonium halide, such as cetyl-dimethyl-benzylammonium chloride, Onyx BTC 824 (a mixed alkyl-dimethylbenzylammonium chloride), Onyx BTC 927 (a mixed alkyl-dimethyl-dimethyl-benzylammonium chloride), dodecyl-diethyl-benzylammonium chloride and other amines as described in copending application, Serial Number 585,627, filed on May 18, 1956, now Patent No. 2,773,276. A particularly useful amine is a commercial material known as Arquad C; which is available in a 50% by weight solution in isopropanol or a 33% aqueous solution, consisting of about 50% dodecyltrimethylammonium chloride together with lesser amounts of octadecyl-, tetradecyl-, hexadecyl-, octadecenyl-, octyl- and decyl-trimethylammonium chlorides.

Crude forms of the antifungal antibiotics, such as crude rimocidin base as well as salts, for example, the sulfate salts and others may be incorporated into the compositions of this invention. Crude amphoteric nystatin is preferred but since it is amphoteric, acidic and basic salts may also be prepared and are considered within the scope of this invention.

The following examples are given by way of illustration and are not to be construed as limitations of this invention many variations of which are possible within the scope and spirit thereof.

EXAMPLE I

A feed composition was prepared containing the following ingredients:

| | Percent |
|---|---|
| Ground yellow corn | 51.28 |
| Soybean oil meal (51%) | 38.15 |
| Corn oil | 6.10 |
| CaCO₃ | 1.20 |
| Dicalcium phosphate | 1.35 |
| Salt | 0.61 |
| Delmix (commercially available mineral mix containing CaCO₃ and small amounts of iron, zinc, manganese, and so forth, salts—Limestone Products Corporation of America, New Jersey) | 0.1 |
| Vitamin A (5305 I.U./lb.) | 0.1 |
| Vitamin D₃ (681 I.C.U./lb.) | 0.05 |
| Klotogen F (commercially available form of vitamin K—Abbott Laboratories) | 0.0003 |
| Pyridoxine hydrochloride | 0.0006 |
| D,L-methionine | 0.140 |
| Niacin U.S.P. | 0.0025 |
| Choline chloride (25%) | 0.2 |
| Riboflavin | 0.06 |
| Calcium pantothenate (45%) | 0.002 |
| Myvamix (commercially available form of vitamin E) | 0.5 |

Various levels of oxytetracycline and rimocidin mixture were thoroughly blended into samples of this feed composition. Broilers, Nichols males and females, were fed on these compositions, about 50 birds to each pen, where free access to feed and water was provided. The results are given in Table I based on the average weight of the broilers and average feed efficiency after nine weeks of growth.

Table I

| Oxytetracycline (g./ton) | Rimocidin (g./ton) | | | | | | | |
|---|---|---|---|---|---|---|---|---|
| | None | | 0.2 | | 2.0 | | 20.0 | |
| | Wt. (lbs.) | Feed eff. | Wt. (lbs.) | Feed eff. | Wt. (lbs.) | Feed eff. | Wt. (lbs.) | Feed eff. |
| 0 | 2.98 | 2.28 | 3.12 | 2.21 | 3.06 | 2.18 | 3.17 | 2.20 |
| 10 | 3.07 | 2.33 | 3.14 | 2.15 | 3.14 | 2.13 | 3.17 | 2.17 |
| 100 | 3.07 | 2.17 | 3.15 | 2.12 | 3.19 | 2.11 | 3.23 | 2.16 |
| 500 | 3.09 | 2.16 | 3.17 | 2.11 | 3.20 | 2.10 | 3.21 | 2.17 |

In these trials, oxytetracycline levels were obtained by incorporating the required amounts of oxytetracycline-Arquad salts which had an antiobiotic potency of about 500 mcg./mg. Crude rimocidin base was used as a source of the antifungal antibiotic. Table II gives performance indices (9 week weight/feed efficiency) of the same trials.

Table II

| Oxytetracycline (g./ton) | Rimocidin (g./ton) | | | |
|---|---|---|---|---|
| | 0 | 0.2 | 2.0 | 20 |
| 0 | 1.31 | 1.41 | 1.40 | 1.44 |
| 10 | 1.32 | 1.46 | 1.47 | 1.46 |
| 100 | 1.41 | 1.49 | 1.51 | 1.50 |
| 500 | 1.43 | 1.50 | 1.52 | 1.50 |

These test animals were healthy and developed no noticeable infections during the growth period.

EXAMPLE II

The procedure of Example I was repeated employing chlortetracycline hydrochloride in place of oxytetracycline with similar results.

EXAMPLE III

A feed composition was prepared of the following ingredients:

| | Percent |
|---|---|
| Yellow corn | 71.9 |
| 45% soybean oil meal | 25.0 |
| Iodinized salt | 0.5 |

| | Percent |
|---|---|
| Dicalcium phosphate | 0.5 |
| $CaCO_3$ | 1.1 |
| Vitamin premix | 0.5 |
| Trace mineral mix | 0.5 |

The vitamin premix contained: Vitamin A, 200,000 I.U.; vitamin $D_3$, 60,000 I.U.; vitamin $B_{12}$, 1.2 mg.; riboflavin, 60 mg.; pantothenic acid, 400 mg. with enough carrier to make one pound. The trace mineral mix contained the following ratio:

| | G./100 g. mixture |
|---|---|
| $FeSO_4$ | 3.0 |
| $CuSO_4$ | 0.5 |
| $CoCl_2$ | 0.8 |
| $MnSO_4$ | 5.0 |
| $ZnCO_3$ | 9.0 | in a carrier. Samples of this feed were individually treated with rimocidin, oxytetracycline and mixtures of rimocidin and oxytetracycline which were thoroughly blended to ensure homogeneity. Growing and finishing swine of about 48 pounds weight were fed with these compositions to about 200 pounds of weight. Improved feed efficiencies were realized although only slight weight increases were noted. Control animals fed on antibiotic-free diet showed an average daily gain of 1.51 pounds at a feed efficiency value of 3.59. Other animals fed on the above mentioned feed in which 100 mg. per ton of rimocidin was incorporated showed 1.53 pounds average daily gain at the same feed efficiency. Animals fed with feed containing 50 grams/ton of oxytetracycline had an average daily gain of 1.55 pounds at a feed efficiency of 3.50. Swine fed with this feed containing 50 grams of oxytetracycline and 100 mg. of rimocidin per ton of feed showed an average daily gain of 1.54 pounds at a feed efficiency of 3.36.

These data demonstrate clearly the increased feed efficiency of the feeds containing oxytetracycline and rimocidin. The animals fed with these latter feed compositions were healthy normal animals which developed no noticeable infections or disease.

EXAMPLE IV

The procedure of Example I was repeated with crude amphoteric nystatin in place of rimocidin with comparable results.

EXAMPLE V

The procedure of Example I was repeated with tetracycline base in place of oxytetracycline with comparable results.

EXAMPLE VI

The process of Example V was repeated employing equivalent amounts of tetracycline hydrochloride with comparable results.

EXAMPLE VII

The process of Example I was repeated employing equivalent amounts of rimocidin sulfate with comparable results.

EXAMPLE VIII

The process of Example I was repeated with equivalent amounts of oxytetracycline hydrochloride with comparable results.

What is claimed is:

1. A growth-accelerating animal feed composition which comprises a standard, nutritionally balanced feed composition, about 10 to about 500 grams of a tetracycline-type antibiotic per ton of said feed composition and about 100 mg. to about 20 grams of an antifungal agent per ton of said feed composition, said antifungal agent being selected from the group consisting of rimocidin and nystatin.

2. A growth-accelerating animal feed composition comprising a nutritionally balanced quantity of carbohydrate, protein, vitamins and minerals, about 10 to about 500 grams of a tetracycline-type antibiotic per ton of said feed composition and about 100 mg. to 20 grams of an antifungal agent per ton of said feed composition, said antifungal agent being selected from the group consisting of rimocidin and nystatin.

3. A growth-accelerating animal feed which comprises grain, animal protein, vegetable protein, vitamins, minerals, about 10 to about 500 grams of a tetracycline-type antibiotic per ton of said feed composition and about 100 mg. to about 20 grams of an antifungal agent per ton of said feed composition, said antifungal agent being selected from the group consisting of rimocidin and nystatin.

4. A growth-accelerating animal feed composition which comprises about 10 to about 500 grams of a tetracycline-type antibiotic per ton of said feed composition, about 100 mg. to about 20 grams of an antifungal agent per ton of said feed composition, said antifungal agent being selected from the group consisting of rimocidin and nystatin and a major proportion of a standard feed composition containing substantially between 50% and 80% of grains, between 0% and 10% of animal protein, between 5% and 30% of vegetable protein, between 2% and 4% of minerals together with supplementary vitaminaceous sources.

5. A growth-accelerating animal feed composition which comprises a standard feed composition containing grain, vegetable protein, animal protein, vitamins and minerals, from about ten to about 500 grams of a tetracycline-type antibiotic and from about 0.2 gram to about 20 grams of an antifungal agent selected from the group consisting of rimocidin and nystatin per ton of feed.

6. A growth-accelerating animal feed composition as claimed in claim 2 wherein the tetracycline-type antibiotic is oxytetracycline.

7. A growth-accelerating animal feed composition as claimed in claim 2 wherein the tetracycline-type antibiotic is chlortetracycline.

8. A growth-accelerating animal feed composition as claimed in claim 2 wherein the tetracycline-type antibiotic is tetracycline.

9. A growth-accelerating animal feed composition as claimed in claim 2 wherein the antifungal agent is rimocidin.

10. A growth-accelerating animal feed composition as claimed in claim 2 wherein the antifungal agent is nystatin.

11. A process for promoting the growth of an animal, which process comprises administering to said animal a feed composition comprising about 10 to about 500 grams of a tetracycline-type antibiotic per ton of said feed composition, about 100 mg. to about 20 grams of an antifungal agent per ton of said feed composition, said antifungal agent being selected from the group consisting of rimocidin and nystatin, and a major proportion of a standard nutritionally-balanced feed composition.

References Cited in the file of this patent

Sternberg et al.: Antibiotics Annual, 1953–54, pp. 199–209, Medical Encyclopedia Inc., N.Y.C.

Cunha: Proceedings First International Conference on Use of Antibiotics in Agriculture, National Academy of Sciences, Washington 25, D.C., pp. 9–17.

Antibiotics Annual, 1955–1956, Medical Encyclopedia Inc., N.Y.C., pp. 856–861.

Campbell et al.: Antibiotics and Chemotherapy, April 1954, p. 406.